Sept. 15, 1964  E. W. SHOWALTER, JR  3,148,439
METHOD OF MAKING A COMMUTATOR STRIP PLATE
Original Filed July 18, 1958  4 Sheets-Sheet 1

INVENTOR.
EDWARD W. SHOWALTER JR.
BY
Max L. Farmer
ATTORNEYS.

Sept. 15, 1964  E. W. SHOWALTER, JR  3,148,439
METHOD OF MAKING A COMMUTATOR STRIP PLATE
Original Filed July 18, 1958  4 Sheets-Sheet 2
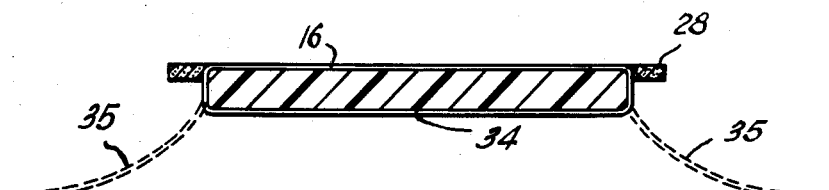
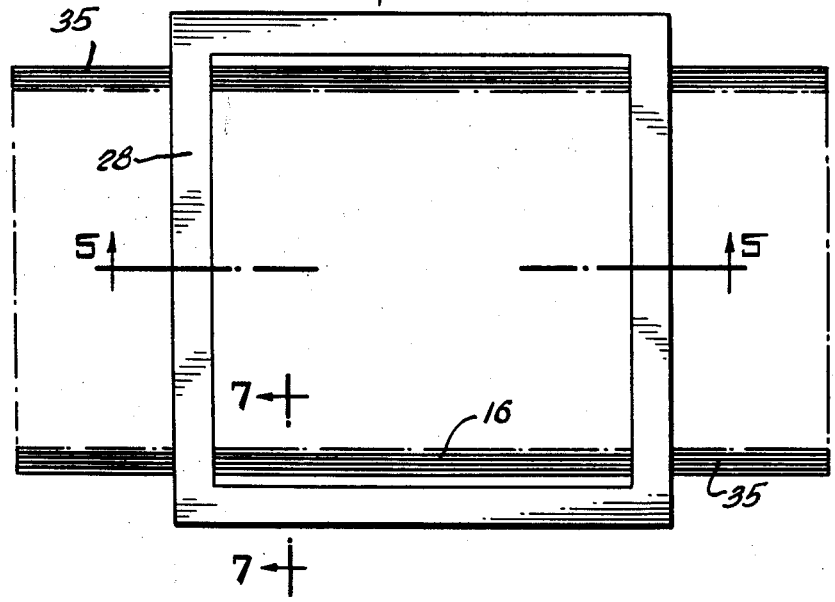
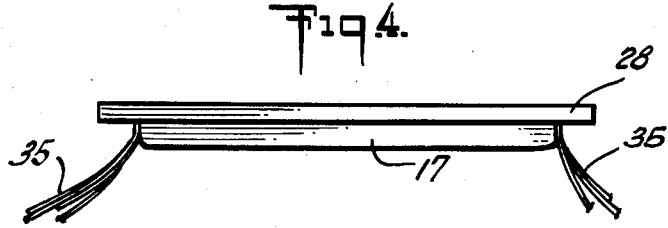
INVENTOR.
EDWARD W. SHOWALTER JR.
BY
ATTORNEYS.

Sept. 15, 1964 E. W. SHOWALTER, JR 3,148,439
METHOD OF MAKING A COMMUTATOR STRIP PLATE
Original Filed July 18, 1958 4 Sheets-Sheet 3
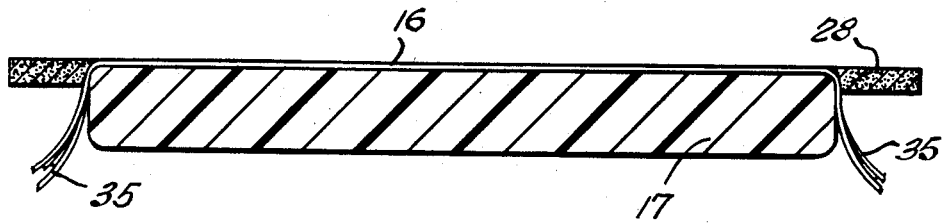
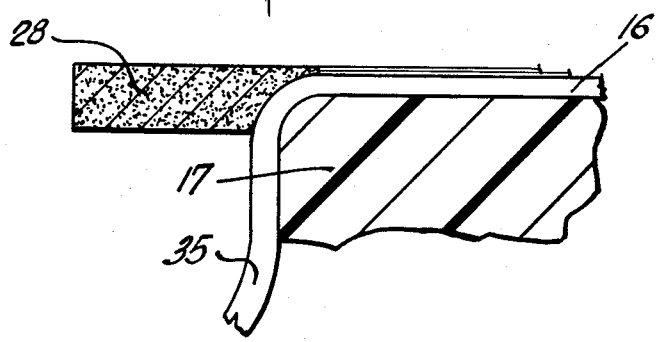
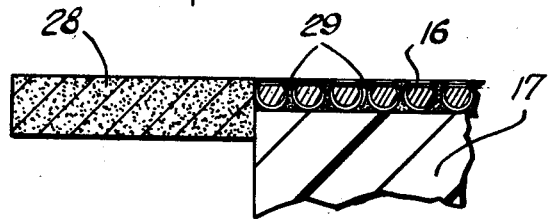
INVENTOR.
EDWARD W. SHOWALTER, JR.
BY
Max A. Farmer
ATTORNEYS.

Sept. 15, 1964 E. W. SHOWALTER, JR 3,148,439
METHOD OF MAKING A COMMUTATOR STRIP PLATE
Original Filed July 18, 1958
4 Sheets-Sheet 4

INVENTOR.
EDWARD W. SHOWALTER, JR.
BY Max L. Farmer
ATTORNEYS.

United States Patent Office 3,148,439
Patented Sept. 15, 1964

3,148,439
METHOD OF MAKING A COMMUTATOR
STRIP PLATE
Edward W. Showalter, Jr., 51 Vauxhall St.,
New London, Conn.
Original application July 18, 1958, Ser. No. 749,565, now
Patent No. 3,049,604, dated Aug. 14, 1962. Divided
and this application June 28, 1961, Ser. No. 127,073
10 Claims. (Cl. 29—155.54)
(Granted under Title 35, U.S. Code (1952), sec. 266)

The invention described herein may be manufactured and used by or for the Government of the United States of America for governmental purposes without the payment of any royalties thereon or therefor.

This invention relates to commutators and more particularly, to a commutator comprising a bank of electrical conductors and a method for making same. It is particularly useful in an array scanning compensator and in connection with an array of hydrophones.

Commutator strip plates are used in conjunction with brushes to make contact between two sets of components in an electronic circuit. By moving either the plate or the brushes, individual components or elements of one set may be connected to several or all of the elements of the other set in a predetermined sequence. In sonar such plates are sometimes called artificial water plates because they are used to connect electronic delay lines to an array of hydrophones and thus to simulate the acoustic delay experienced by the signal reaching the most remote hydrophones in the water. Split commutator strip plates, the halves of which have been cut perpendicular to the conducting strips thereof and insulated from each other, may be used in such devices as bearing-deviation indicators, for pattern-forming, and other applications.

Heretofore, one typical form of commutator strip has consisted of a large number of metallic parallel bars having interleaving sheets of an insulating material therebetween. The bars and insulation are impregnated with a suitable lacquer and bolted together with several long bolts. After assembly, the contact surface is machined with a planer. Another form of known commutator strip consists of a series of electrical conducting strips silver electroplated on to a ceramic panel, the panel in turn being bolted to a rectangular aluminum casting which serves as a mounting plate.

The above-described commutator strips possess many serious disadvantages. Among these disadvantages are (1) the inability to provide commutator strip plates having a large number of strips per inch, (2) the necessity of soldering lead line wires from electrical connections to each individual strip, and (3) expensiveness of fabrication since assembly and soldering operations are time and labor consuming. The limitation upon the amount of contact strips per inch leads to the undesirable characteristics of interpolation error and commutation noise.

An object of the invention is to provide an improved commutator which has a large number of very narrow strips closely arranged, side by side, which is approximately square and relatively broad in face area, which provides insulated individual leads to the individual strips or stretches in a simple manner, with which the formation in use of grooves in the spacing insulating material between adjacent metal strips or stretches will be avoided, with which the shorting of adjacent metal stretches or strips by wear particles of metal will be avoided, which will have uniformity in the widths of the adjacent individual commutator strips or stretches for relatively large face areas of the commutation as measured in the direction in which the stretches extend, and which will be relatively strong, durable, compact, practical and inexpensive.

Another object is to provide an improved practical and simple method of making a commutator that will satisfy the above mentioned objects.

Other objects and advantages will be apparent from the following description of an embodiment of the invention and the novel features will be particularly pointed out in connection with the appended claims.

In the accompanying drawings:

FIGURE 2 is a sectional elevation of a partially completed commutator constructed in accordance with this invention and illustrating an intermediate step in the manufacture of the commutator;

FIG. 3 is a plan view of a commutator constructed in accordance with this invention;

FIG. 4 is a side elevation of the same;

FIG. 5 is a sectional elevation on a larger scale of the commutator of FIG. 3, the section being taken approximately along the line 5—5 of FIG. 2;

FIG. 6 is a sectional elevation similar to FIG. 5 of a part of the commutator but on a still larger scale to illustrate details of construction that are difficult to illustrate on a smaller scale;

FIG. 7 is a fragmenary sectional elevation of a small part of the finished commutator of FIG. 3, but on a much larger scale to illustrate certain details of construction;

Figure 1:
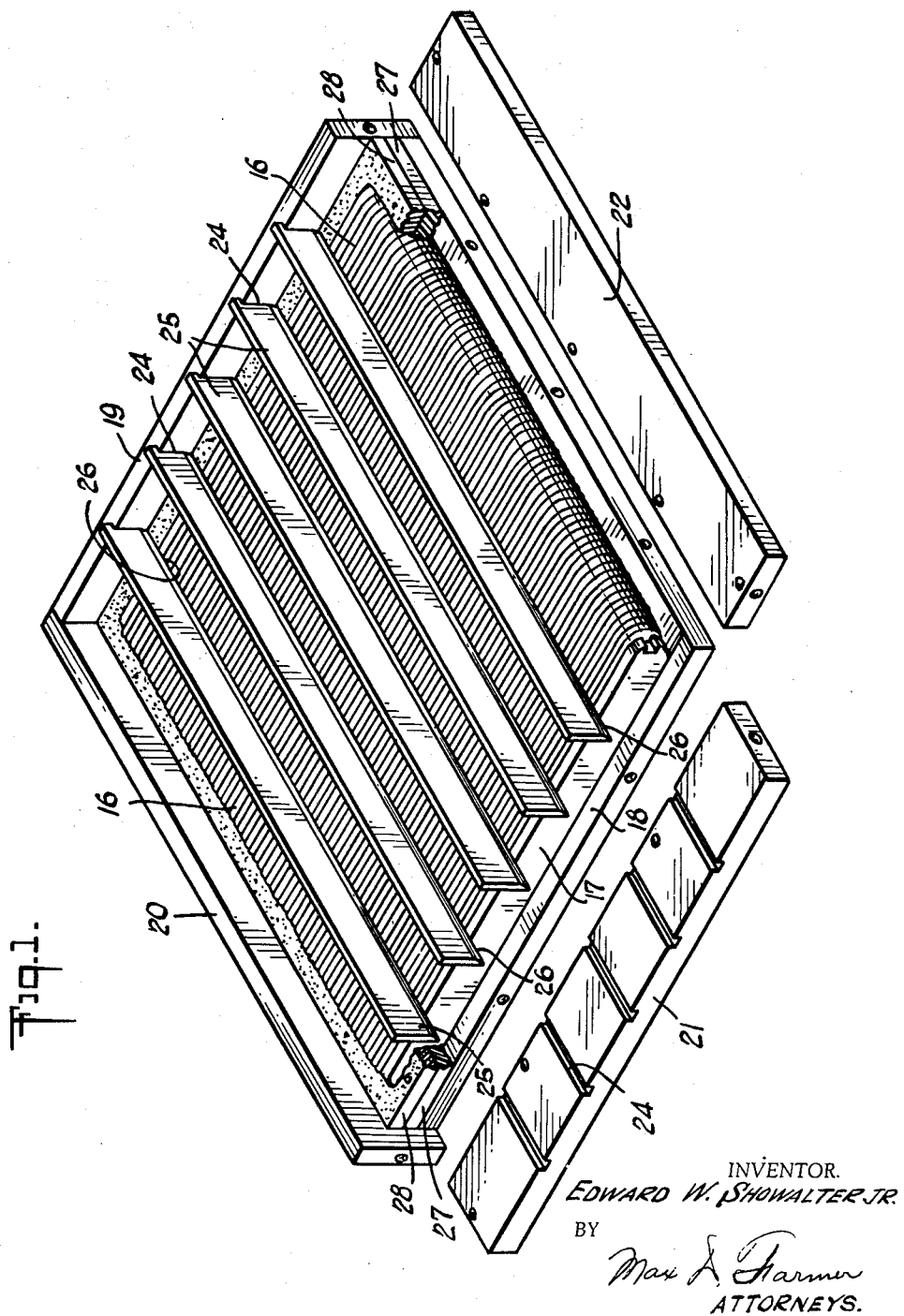
FIG. 1 is a three dimensional view illustrating an intermediate step in the manufacture of a commutator in accordance with this invention.

In the embodiment of the invention illustrated in FIGS. 1 to 12 inclusive, and referring first particularly to FIG. 1, an insulated copper wire 16 is wound progressively around a plate-like core 17 of electrically non-conducting material of any suitable kind, one of which, for example, is a plate formed of a urea- or phenolformaldehyde resin that is available in the market under the commercial name of "Formica." There is only one layer of wire on the core, and the wire stretches across each face of the core, lie side by side in a single layer, and the adjacent turns may be in contact with one another or spaced slightly apart as may be desired, depending upon the number of turns or stretches of wire per inch desired on a face of the core.

In the illustrated example, the wire 16 is a #23 copper magnet wire insulated with a coating of a vinyl-acetal enamel, one form of which enamel is known commercially as "Formvar." The core is approximately square with relatively broad faces in both directions as compared to the thickness of the core, and one practical example of such a core is about 5 inches for each side of the square on a face of the core, but the dimensions of the faces of the core may be varied substantially in each direction yet retaining the approximately square face areas.

The core with the insulated copper wire 16 wound thereon is placed upon the bottom wall 18 of a box which has side walls 19, 20, 21 and 22 that are secured to the margin of the bottom wall and extend upwardly from the bottom wall to form an enclosure encircling the peripheral margin of the core and wire coil wound thereon, but with a small space between the margin of the core and wire thereon and the side walls 19, 20, 21 and 22 of the box. The side walls 19 and 21 which are adjacent the ends of the coil of wire 16 on the core have vertical slots 24 arranged at intervals along the lengths of the walls 19 and 21, and cross bars 25 extend between the walls 19 and 21 and have their ends disposed in the slots 24, so as to be held in upright position over a face of the core and the wire 16 thereon in directions crosswise of the lengths of the stretches or turns of wire on the upper face of the core. These bars 25 are slidable vertically to contact against the turns of wire 16 on the upper face of the core and hold the wire stretches flat against the core face. The lower edges 26 of the bars 25 are bevelled or tapered to approximately a sharp edge which engages with the wire so that while in contact with wire 16, the bars will occupy a minimum of surface area on the turns of the wire 16.

Because of the substantial breadth of the faces of the core, a wire when wound around the core over a dimension greater than about one inch would be likely to bow arcuately and substantially away from the face of the core intermediate of the ends of the turns, because such wires as wound on the core do not lie perfectly flat against such broad face of the core. If they did not lie in contact with the upper face of the core for their entire length across that face, the flat areas to be formed on the wires would vary in width along a stretch of the wire. These bars 25 therefore serve to hold the turns of wire on the upper face of the core in firm or snug contact with the upper face of the core while potting material is applied to the wire 16 and core and cured in order to bind the wires together and to the core.

The marginal edge of the upper face of the floor 18 is provided with an upstanding strip 27 fitting the space between the peripheral margin of the core with wire wound thereon and the upright walls of the box, but terminating substantially short of the upper face of the wire turns on the upper face of the core. Upon this strip 27 is placed a layer 28 of plastic material which is capable of hardening upon standing, such as mortite putty which forms a permanent confining frame. This layer 28 extends upwardly to about the upper face of the layer of wire. The upper exposed face of the core and wire turns thereon are then coated with a layer 29 of potting material which may be cured by standing or by heat, such as a thermosetting plastic, one example of which thermosetting plastic is available in the market under the commercial name of "Hysol." Any other plastic potting material which is an electrical insulator may be employed if it can be cured or hardened by cooling, or by standing, or by the application of some heat. By the use of the term curing, I contemplate referring to the setting of any potting material by standing or cooling, or by the application of a curing heat. This potting material 29 while plastic is forced between the adjacent wire turns on the upper face of the core and into contact with the upper face of the core, so as to fill the spaces between the wires.

Figure 8:
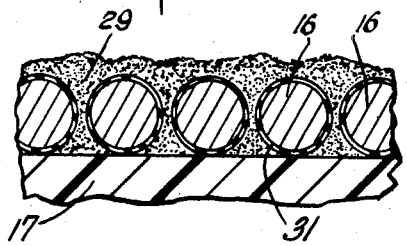
FIG. 8 is a fragmnetary sectional elevation of a small part of the core, with a few turns of insulated wire thereon and the first potting material applied to illustrate an early step in the manufacture of the commutator.
Figure 9:
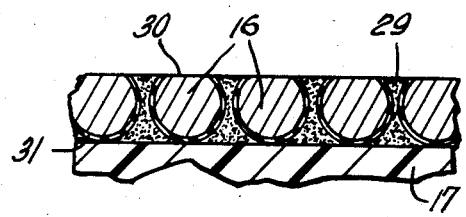
FIG. 9 is similar to FIG. 8 but illustrating a later step in the manufacture of the commutator.

Due to the fact that the wires are round in cross section, the potting material serves to fill the spaces created by the curved surfaces of adjacent wire turns. The cured potting material serves to bond the adjacent turns of wires to one another and to the upper face of the core. This is illustrated in FIG. 8. After this potting material 29 between the wires has cured, hardened, or set, the core with the wire wound thereon is removed from the box, and the upper face of the layer of wire and hardened potting material is machined off, such as by a planing operation, to remove segments of the cylindrical wires and provide flat surfaces 30 (FIG. 9) on the upper faces of the wire turns. This machining operation also removes the plastic or potting material down to the same level, so that the upper exposed face or surface of the potting material and the flat areas on the wire will all be in the same common plane as shown in FIG. 9. It will be noted that during the machining operation, some of the insulation 31 surrounding each wire on the top of the wire turns is removed, so that the flat areas of wire, wire insulation and potting material will all lie in a common plane parallel to the upper face of the core.

Figure 10:
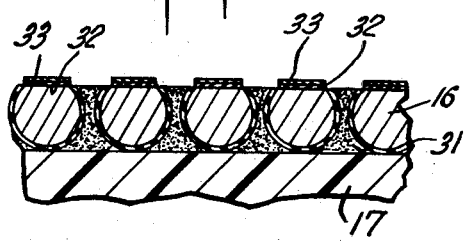
FIG. 10 is similar to FIG. 9 but illustrating a still later step in the manufacture of the commutator.
Figure 11:
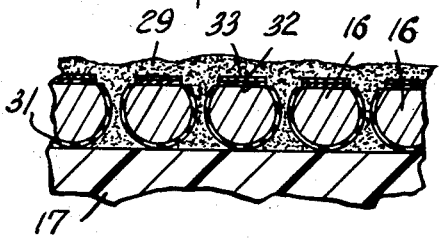
FIG. 11 is similar to FIG. 10, but illustrating a still further step in the manufacture of the commutator.

Since copper, of which the wire is preferably made, is a relatively soft metal and wears easily by abrasion, it is preferable to provide on the exposed flat surfaces 30 of the wire turns a superposed coating of a different metal. This coating is illustrated in FIG. 10 and may include a very thin base layer 32 of metallic nickel and superposed on that a layer 33 of metallic silver. These metallic layers are easily provided on the flat areas 30 by plating, during which operation the plating metal does not adhere to or form on the potting material or wire insulation between the adjacent turns of wire. It will be noted from FIG. 10 that this leaves some shallow grooves between the coatings on adjacent turns of wire, and such grooves would be objectionable in that small metal particles may be lodged therein by commutator brushes moving thereover, and such lodged particles would be likely when in the grooves to electrically short-circuit adjacent wire turns. Therefore, the grooves or spaces between the superposed coatings of adjacent turns of wire are filled with further potting material, at least to a level with the upper or exposed face surface of the superposed coating 33, and at times higher than that level, as illustrated in FIG. 11. After this added potting material has hardened, the upper face of this core with wire wound thereon, is again machined down to the level of the upper face of the coating 33. In doing so, any excess of the added potting material above the exposed face of coating 33 will be removed so that the exposed upper face of the added potting material and the coated wire faces will be in the same common plane. This is shown in FIG. 12 and it will be observed that there are now no grooves between the silver coatings 33.

Figure 12:
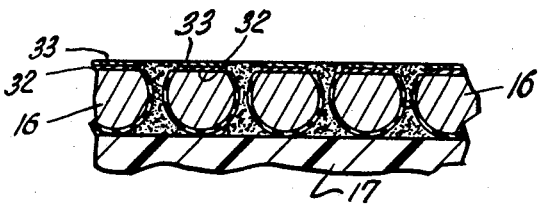
FIG. 12 is a view similar to FIG. 11, but illustrating a late step in the manufacture of a commutator in accordance with this invention.

After the step illustrated in FIG. 12, the wire turns on the under or opposite face of the core are then all severed, such as in the middle or at the point 34 in FIG. 2, and the severed ends are then bent away from the core face into the dotted line positions shown in FIG. 2 so as to form individual insulated leads 35 by which the individual turns or stretches of wire on the upper face of the core may be connected to different electrical circuits, such as to different hydrophones, having in series with these leads and the hydrophones suitable time delay devices which are not shown because the present invention relates to the commutator and its manufacture, and not to the specific circuits to which the commutator may be used. Those bent out leads 35 are shown in full lines in FIGS. 3 to 6.

Figure 13:
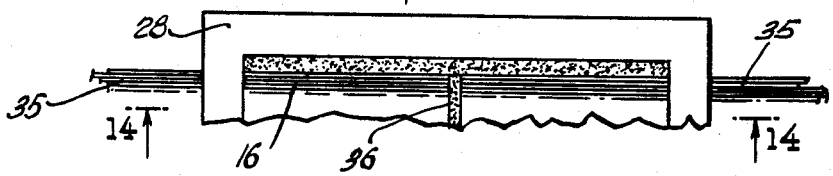
FIG. 13 is a plan of a portion of a commutator constructed in accordance with this invention, but illustrating a modification thereof.
Figure 14:
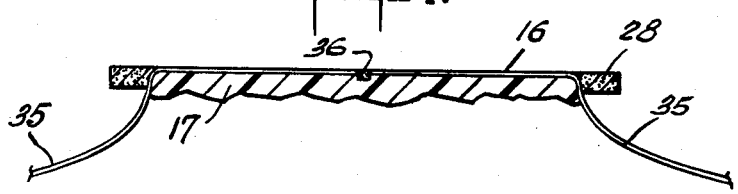
FIG. 14 is a sectional elevation of the modification of FIG. 13, the section being taken approximately along line 14—14 of FIG. 13.

In some instances it may be desirable to divide the commutator into two halves while keeping the two halves on the same single core. This idea is illustrated in FIGS. 13 and 14 where in the case, after the commutator has been formed, as described in connection with claims 1 to 10, the ends of the wire turns or stretches on the upper face of the core are severed along a common line, usually midway between the ends of the stretches, that extends crosswise of and at right angles to the individual stretches of wire on the upper face of the core. This severing leaves a gap 36 of substantial width between the severed wire ends, which is desired in order to electrically segregate the stretches on opposite sides of the line of severance. This gap may be formed by milling a slot across the upper, potted face of the commutator to a depth sufficient to fully sever the wires and provide a gap having a width equal to the thickness of the milling tool. This gap, after it has been cleaned out of any burrs or particles of metal that were formed during the milling operation, is filled with more of the plastic, curable potting material up to a level at least equal to the top of the flat areas on the coatings on the wires. After this added potting material has cured or set, it is machined to remove excess potting material above the exposed flat faces of the wires, and the upper surface of the added potting material in this gap would then be in the same common plane as all the metal surfaces on the adjacent turns of the wire. The leads 35 at the opposite ends are then connected to different circuits.

The wires or leads on opposite sides of the commutator in both illustrated examples of the invention extend down the marginal edge of the core to a substantial extent and are permanently held in that relation by the hardened mortite putty. The leads 35 which still carry the wire insulation can be easily connected to the necessary lag line terminals or connectors, which makes the soldering of lead wires to each wire strip unnecessary. The commutator so prepared, may be used, for example, as a compensator switch with which the fixed hydrophone array of a submarine or ship may be electrically steered. The use of silver wires wound around a core and made flat on the exposed face of a layer of wires has been previously proposed. A silver wire is very expensive and machining off of some of the wire to obtain flat surfaces causes a loss of silver. Copper wire is desirable of its high conductivity of electricity and because it is readily flexible for winding on the core, but use of the copper wire alone was not entirely satisfactory because the exposed surface of the copper wire wore appreciably and became corroded. It wore down under abrasion from the brushes at a different rate than the plastic or potting material. Hence there was a tendency for grooves to form between the adjacent turns of the copper wire. By plating the exposed flat surfaces of the copper wire where they had been machined off, with a metal which was less corrosive and wore at a rate differently than the copper, and at about the rate at which the potting material wore, made the use of copper practical and less expensive. While the entire superposed metal coating might be all silver, I have found it preferable to plate the exposed copper flat surface of the different turns of wire with a base coat of metallic nickel having a minimum thickness of about .0002 inch and applying over it a thin surface coat of metallic silver having a minimum thickness of about .0003 inch.

This application is a division of my application Serial No. 749,565, filed July 18, 1958, now Patent No. 3,049,604, which in turn is a continuation-in-part of patent application Serial No. 541,869 filed October 20, 1955, for Method of Constructing Commutator Strip Plates by Edward W. Showalter, Jr.

It will be understood that various changes in the details, materials, and arrangements of parts, which have been herein described and illustrated in order to explain the nature of the invention, may be made by those skilled in the art within the principle and scope of the invention, as expressed in the appended claims.

I claim:

1. The method of constructing commutator strip plates with face areas that are relatively broad in both directions, which comprises winding an insulated, electrically conductive wire of a ductile metal as a coil progressively around an electrically non-conductive, plate-like core having face areas that are approximately square and relatively broad in both directions, with the wire turns crossing the faces of the core, temporarily confining the wire turns on one face of the core firmly against that core face at intervals across it, applying an electrically non-conductive, curable potting material to said one face of the core and to the coil turns so confined thereagainst, with the potting material between and spacing successive adjacent turns of the coil and binding them to one another and to the core, and extending partly down the coil turns on the marginal edges of the core, removing from the exposed potted face of the coil enough wire insulation and wire surface to expose a flat area of the metal of the wires over the potted face of the coil in a common plane, and severing the wire in the stretches on the opposite, unpotted face of the core, removing the temporary confining means, adding further potting material to fill the spaces previously occupied by the confining means, and bending the severed ends of the wire stretches at one side of the core away from the core to provide relatively long, individual, insulated leads for the upper potted stretches of the wire for individual connection to suitable circuits.

2. The method as set forth in claim 1, and electroplating upon the bare areas of the wire of the coil stretches exposed by said removal of wire and insulation, a coating of metallic silver, then applying additional potting material to said one face of the core and coated wires thereon to fill the grooves, formed by the coating, between adjacent conductors, curing the additional potting material on the core, and then removing any of the cured additional potting material which is above the silver coating so as to expose the face of the coating and provide a common plane of potting material and the exposed face of the silver coated surface.

3. The method of constructing a commutator strip plate with a relatively broad face area, which comprises winding an insulated copper wire as a coil progressively around an electrically non-conductive plate-like core having an approximately square face area that is approximately as wide in the direction in which the wire turns extend over that face area as the length of such turns, temporarily confining snugly against said face area, at intervals thereacross in the direction in which the turns extend, including at least one intermediate interval, the stretches of said wire which overlie that face area, applying a curable potting material over said face area and the confined wire stretches thereover, and also somewhat down those side edges of the core over which the wire coil extends, with the potting material between and spacing successive adjacent stretches of the wire of the coil and binding them to the core, curing the applied potted material, removing insulation and wire from the exposed face of said stretches on said face area, to provide flat areas in a common plane on both the wire and adjacent potting material on said one face of the core, severing the wire of the coil along the unpotted face of the core, and bending the severed ends of the turns of the coil away from the unpotted face of the core to provide individual, relatively long insulated leads leading to the stretches of the wire on said potted face, whereby the potting material on the sides of the core and coil will prevent lifting of a wire stretch from the potted face of the core when tension is applied to a lead end of that stretch.

4. The method of making a commutator strip plate with a relatively broad face area, which comprises winding an electrically conducting insulated wire as a coil progressively around an electrically non-conductive, plate-like core having a face area that is approximately as wide in the direction in which the wire stretches of the coil extend over that face area as the length of such stretches, placing a confining wall around the sides of the core and coil thereon, with a substantial space between the wall and the ends of the coil stretches that are adjacent that wall, applying bars with a thin edge edgewise with the thin edge against said wire stretches on said face areas at intervals thereacross in the direction in which the wire stretches extend, including at least one intermediate interval, to confine said stretches firmly against said core face and extending in directions crosswise of the lengths of such stretches, applying a curable potting material to that face of said core with the wire stretches confined thereagainst and to said stretches with sufficient force to penetrate between the wire stretches and bond them to said core, and with the potting material extending well down into and filling said spaces at the ends of the stretches, curing the potted core, then removing said confining bars and wall, removing from said potted face of wires enough of the exposed insulation and wire beneath the insulation to form and expose flat areas on the wires of the stretches on that face of the core and in the same plane with the planed surface of the potted material, and severing the wire stretches on the unpotted face of the core to provide individual insulated leads for the planed stretches of wire on the potted face of the core, whereby no permanent encircling frame is required to prevent tension on the leads from lifting the stretches from the potted face of the core.

5. A method of constructing a commutator which comprises winding an insulated wire in turns progressively around an electrically non-conductive plate-like core that is approximately square and with relatively broad faces, with all turns of said wire in direct contact with one of said core faces and lying side by side in a single layer, applying an encircling frame around the peripheral edge of said core in contact therewith solely along a marginal strip of said peripheral edge which borders the face of said core opposite from said one face and spaced from said one core face, applying a coating of an electrically non-conductive and plastic but curable potting material against said one face of said core and a marginal strip of the periphery of said core bordering said one face, with sufficient pressure to force it between stretches of said wire and into contact with said one face of said core, with said coating rising from said one face at least approximately for the thickness of the group of wires on said one face, curing said potting material to bond said wire stretches to said one face of the core and to each other, removing from an exposed surface layer of the cured potting material and the wires on said one face sufficient of said material, wire insulation and wires to provide a continuous plane surface exposing flat areas of said wire stretches spaced by said cured potting material, severing the wire turns at said opposite face of the core along a line intermediate of the ends of the stretches of wire on that core face, bending severed wire ends of said wire at one side of said line away from the core to provide relatively long, insulated leads for individual connection to suitable circuits, and removing said frame.

6. The method as set forth in claim 5 wherein said wire is copper, and temporarily confining the wires snugly against said one face of said core at spaced intervals across the interior area of the face of said core while said potting material is being applied to the wire and core and cured, whereby the wire stretches on said one face will be in direct contact with the core and when said layer of the wire and cured potting material is removed the flat surfaces on said wire stretches which are thereby exposed will all be of uniform width.

7. The method as set forth in claim 5, and after said curing severing said wire stretches on said one face of said core, intermediate of their ends, along a common line crosswise of the length of said stretches and providing a substantial gap between the severed ends of each stretch, filling said gap with additional potting material and curing this additional potting material while in said gaps.

8. A method of constructing a commutator which comprises winding an insulated copper wire in turns progressively around an electrically non-conductive plate-like core, with all turns of the wire in contact with one face of the core and lying side by side in a single layer on said one core face, bonding the stretches of said wire on said one face together and to said one core face with a plastic resinous potting material, curing the potting material so applied, removing from the exposed surface of said cured material and wires on said one face enough of the wire insulation, the cured material and the wires to provide flat areas in a common plane on said wire stretches and material, plating said flat areas of said wire with a selected plating metal other than copper, filling the spaces between said plated areas with further uncured but curable potting material, curing said further material so applied, removing the exposed surface of the cured further material solely down to the plane of the exposed faces of the plated flat areas of the wire stretches, severing the wire stretches at the face of said core opposite from said one face after one of said curings, and bending severed wire ends at said opposite face away from said core to provide individual leads for connection to selected circuits.

9. The method as set forth in claim 8, and after the first curing severing the stretches of wire on said one face of the core, intermediate of their ends, along a common line crosswise of the lengths of the stretches and at the same time providing a gap of substantial extent between the severed ends of each stretch, filling such gaps with an additional amount of said uncured potting material, curing this additional material in the gaps, and removing the additional cured material down to the plane of the exposed, plated flat areas of said stretches.

10. A method of constructing a commutator, which comprises winding an insulated wire in turns progressively around an electrically non-conducting plate-like core, with all turns of the wire having stretches extending along one face of the core, side by side in a single layer, bonding the stretches of said wire on said one core face to each other and to said core with a resinous potting material, severing said bonded stretches intermediate of their ends along a common line crosswise of said stretches and at the same time providing gaps of substantial extent between the adjacent severed ends of each stretch closing such gaps with further potting material, removing the exposed surface of said potting material, the wire insulation and wire to provide a flat area of the wire, insulation and material in a common plane, severing the turns of wire at the face of said core opposite from said one face, intermediate of their ends, and bending the severed ends of the individual turns of wire at said opposite face way from said core to provide individual insulated leads for connection to selected circuits.

References Cited in the file of this patent
UNITED STATES PATENTS

| | | |
|---|---|---|
| 539,022 | Batchelder | May 14, 1895 |
| 840,451 | Fuld | Jan. 1, 1907 |
| 1,325,325 | Janke | Dec. 16, 1919 |
| 1,595,107 | Lyng | Aug. 10, 1926 |
| 1,835,120 | Poole | Dec. 8, 1931 |
| 2,199,240 | Gwyn | Apr. 30, 1940 |
| 2,317,457 | Heller | Apr. 27, 1943 |
| 2,494,051 | McCoy et al. | Jan. 10, 1950 |
| 2,552,609 | White | May 15, 1951 |
| 2,553,292 | Barrett | May 15, 1951 |
| 2,668,894 | Coates | Feb. 9, 1954 |
| 2,786,985 | Meretey | Mar. 26, 1957 |
| 2,883,743 | Estabrook | Apr. 28, 1959 |
| 2,927,367 | Jarvis | Mar. 8, 1960 |
| 2,949,592 | Smiley | Aug. 16, 1960 |